United States Patent
Dutta et al.

(10) Patent No.: US 6,918,066 B2
(45) Date of Patent: Jul. 12, 2005

(54) METHOD AND SYSTEM FOR EVALUATING APPLICATIONS ON DIFFERENT USER AGENTS

(75) Inventors: Rabindranath Dutta, Austin, TX (US); Janani Janakiraman, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 801 days.

(21) Appl. No.: 09/963,714

(22) Filed: Sep. 26, 2001

(65) Prior Publication Data

US 2003/0061283 A1 Mar. 27, 2003

(51) Int. Cl.[7] ................................................. G06F 11/00

(52) U.S. Cl. ........................... 714/46; 714/47; 715/738

(58) Field of Search ............................. 714/33, 37, 47; 715/501.1, 736, 738

(56) References Cited

U.S. PATENT DOCUMENTS

| | | | |
|---|---|---|---|
| 6,412,008 B1 * | 6/2002 | Fields et al. ................. | 709/228 |
| 6,714,963 B1 * | 3/2004 | Levine et al. ................ | 709/203 |
| 2002/0054052 A1 * | 5/2002 | Sharma et al. ............... | 345/700 |
| 2002/0103914 A1 * | 8/2002 | Dutta et al. .................. | 709/229 |
| 2003/0005044 A1 * | 1/2003 | Miller et al. ................. | 709/203 |

OTHER PUBLICATIONS

"Testing your web page across different web browsers", Jun. 9, 2001, Web page: http://www.masternewmedia.org/2001/06/29/testing_your_web_page_across_different_web_browsers.htm.*
"NetMechanic Pro—Summary Results", Jun. 29, 2001, Web page: http://www.masternewmedia.org/browserphoto/ViewResults.htm.*
"Understanding Bobby", 1996, Web page: http://www.uni.edu/ada/bobby/errors.html.*

* cited by examiner

Primary Examiner—Scott Baderman
(74) Attorney, Agent, or Firm—Jeffrey S. LaBaw; Darcell Walker

(57) ABSTRACT

The present invention is a method to develop and test the WML/HTML applications, and in particular web sites, on a multitude of user agents/browsers at the same time. The user selects the browsers in which the user has an interest. The method executes the web site file on the selected browsers and then displays on a virtual screen, screen shots of the file as viewed on different browsers. The user can use this information to modify their HTML/WML source code and run the code again through the program and view the changes in the output. The present invention can incorporate a WML/HTML editor, which will allow the user to make changes on-line and recheck their results. This method receives a HTML/WML file, selects a browser on which to display the file, edit the displayed output to the file and displays the edited version of the file on the screen. This process can be repeated for a number of browsers.

43 Claims, 10 Drawing Sheets

| Browser | Score |
|---|---|
| Browser 1 | --7-- |
| Browser 2 | --4-- |
| Browser 3 | --9-- |
| Browser 4 | --8-- |
| Browser 5 | --8-- |

FIG. 9

| Browser | Priority 1 | Priority 2 | Priority 3 | Score |
|---|---|---|---|---|
| Browser 1 | --P-- | --P-- | --N-- | --P-- |
| Browser 2 | --P-- | --N-- | --N-- | --P-- |
| Browser 3 | --N-- | --P-- | --P-- | --N-- |
| Browser 4 | --P-- | --P-- | --P-- | --P-- |
| Browser 5 | --P-- | --N-- | --P-- | --P-- |

FIG. 10

|  | Browser 1 | Browser 2 | Browser 3 | Browser 4 | Browser 5 |
| --- | --- | --- | --- | --- | --- |
| Accessibility | 5 | 8 | 8 | 4 | 6 |
| Load Time | 5 | 5 | 5 | 6 | 6 |
| % of Tags | 95 | 80 | 85 | 88 | 82 |
| Scripts Execution Time | 7 | 5 | 9 | 8 | 10 |
| Total Score | 112 | 98 | 107 | 106 | 104 |

FIG. 11

METHOD AND SYSTEM FOR EVALUATING APPLICATIONS ON DIFFERENT USER AGENTS

FIELD OF THE INVENTION

The present invention relates to a method and system to evaluate a computer application executing in different computing network environments and in particular this invention relates to a method and system to test, edit and compare characteristics of a computer application simultaneously on different user agents known as browser programs.

BACKGROUND OF THE INVENTION

The Internet is an international digital data network that interconnects digital equipment of various users, such as commercial companies, educational institutions, government branches and individuals. The World Wide Web referred to, as "WWW" is a part of the Internet network, which communicates according to a standard hypertext transfer protocol known as http. The World Wide Web is a very popular way of presenting and/or accessing information, on a variety of topics, stored on computing machines connected to the Internet.

WWW resources are organized to allow users to move easily from one resource to another. Users generally navigate through the WWW using an application known as a WWW browser client. The browser presents formatted text, images, sound, or other objects, such as hyperlinks, in the form of a WWW page on a computer screen. The user can click on a hyperlink with the cursor to navigate to other WWW pages on the same source computer, or server, or on any other WWW server on the network. The WWW links exist across the global Internet to form a large-scale, distributed, multimedia knowledge base that relates words, phrases, images, or other information. Smaller-scale implementations may occur on enterprise Internets.

Locations for information that may be accessed via the World Wide Web are referred to as web sites. Web sites generally offer an appearance that resembles the graphical user interfaces (GUI) of Microsoft's Windows operating system, Apple's Macintosh operating system, and other graphics based operating systems. They may include scroll bars, menus, buttons, icons, and toolbars, all of which can be activated by a mouse or other input device.

To find a web site, a user can consult an Internet reference guide or directory, or use one of the many freely available search engines, such as WebCrawler and Yahoo. These engines are search and retrieval programs, of varying sophistication, that ask the user to fill out a form before executing a search of the WWW for the requested information. The user can also create a list of the URLs of frequently visited web sites. Such a list helps a user recall a URL and easily access the desired web site. Web sites are easily modified and updated, so the content of many sites changes frequently.

Typical organization of the information to be presented at a web site includes various web pages. A web page is a document designed to be accessed and read over the web. These pages are arranged in a sequence that leads to the information that the user desires to access. The initial page in a web site is a home page. It is a hypertext document that allows a user to interactively select the next page, which hopefully is one that has the information the user desires. These web pages often include graphics, which means that many data bits must be transferred, and much time or data bandwidth used for each page.

WWW pages are formatted using Hypertext Markup Language (HTML). Information on these pages is transferred among computers on the WWW using a set of rules known as Hypertext Transfer Protocol (HTTP). Other features may be added to web pages with special programs, such as Java, a programming language that is independent of a computer's operating system, developed by Sun Microsystems. Java-enabled web browsers use applets that run within the context of HTML-formatted documents. With applets it is possible to add animation and greater interactively to web pages.

The content presented on a web site usually contains hypertext and icons, pictures that also serve as links to other sites. By clicking on the hypertext or icons with their mouse, users instruct their browser program to connect to the web site specified by the URL contained in the hypertext link. These links are embedded in the web site through the use of HTML that encodes the links with the correct URL.

Every web site has a specific address on the WWW called a Uniform Resource Locator (URL). These addresses end in extensions that indicate the type of organization sponsoring the web site, for example, .gov for government agencies, .edu for academic institutions, and .com for commercial enterprises. The user's computer must be connected to the Internet and have a special software program called a browser to retrieve and read information from a web site. Examples of browsers include Navigator from the Netscape Communications Corporation, Explorer from the Microsoft Corporation and Mosaic and IBM's Web Explorer.

Browsers allow a user to access computers known as "servers" located throughout the world for information, which is stored therein and provided to the user by the server by sending files, or data packs to the requesting user from the server's resources. An example of such a request might be something called GSQL (get SQL), which was a NCSA language and CGI server program developed to getting textual results for a user caller. Some browsers display a web page on a computer screen only when all the data (i.e., text and images) is received. As a result, the computer screen becomes blank for an unbearable period of time (e.g., many minutes) after a request for the web page is made. Other browsers display the text before the images are received. These browsers may use icons at appropriate places on a web page to indicate that images would appear at these places later. When the images are received, the web page needs to be reformatted because the sizes of the icons are different from the sizes of the images. The reformatting process can produce a sudden and annoying change on the computer screen.

The problem with WML/HTML applications is that the number of user agents (browsers) which end user can use is large and diverse and it is increasing all of the time. Currently, one method to tailor the code for different browsers is by testing the applications on the different browsers one by one and tweaking the code to tailor the application to work optimally on each of the browsers. In the WML arena, a given WML page may well look very different on different WAP-enabled devices. The lack of a definitive standard for browsers has resulted in several considerations that need to be considered when designing WAP sites.

During the design of a Web page, the designer wants to make sure that the Web design will work on a number of different Web browsers. As with any form of application development, one of the most important steps is testing. The current method to test the different browsers is to install all of the different browsers on the system and test the Web design on each browser one-by-one. The other solution is to use some of the pre-existing products that test Web browsers one-by-one using an editor and viewer. One such product is called "Browserola." This product does not require a copy of the browser installed to test the Web page. This product has a database of tags representing features from different browsers. It evaluates the source code for the Web site looking for tags for the different browsers. With this product when a Web browser encounters an HTML tag or attribute that the browser does not support, it ignores the tag and continues processing the rest of the page. To emulate each browser, this product analyzes the HTML document, checks a table of supported tags and attributes for the chosen browser and eliminates the tags if they do not exist in the documented.

In addition to testing the web site on the various browsers to determine the effectiveness of each browser, it is also desirable to have a technique that can compare each browser's execution of the web site to a set of criteria established by the web designer. This technique could rank the browsers for effectiveness based on the criteria. One such technique that currently ranks various browsers' accessibility is referred to as "Bobby". Bobby is a tool for Web page authors. It helps them identify potential problems to their pages so users with disabilities can more easily use their Web pages. For example, a blind user will be aided by adding a sound track to a movie, and a hard-of-hearing user will be aided by a written transcript of a sound file on a Web page. Bobby will recommend that these be added if they do not already exist.

Many people with disabilities will use special Web browsers, such as one which reads text out loud using a speech synthesizer for blind users. The suggestions made by Bobby will help authors to add information to a Web page which will help the special browsers work more effectively. In addition to checking for disability access, Bobby finds HTML elements and attributes that are not compatible across browsers.

There also exist another class of services called HTML Validators which are basically HTML syntax checkers which go through the HTML code and identify errors in your HTML source. Bobby also has some level of HTML validation in that it identifies HTML elements and element attributes that are not compatible across browsers. Other HTML services also exist which give you "Page statistics" which tell you how long each file in the web page take to download over different speed access lines.

A Web designer should always test more than one browser when creating a web site. The same document can look quite different from browser to browser unless the document has been evaluated on several browsers (and on multiple platforms) and edited based on these evaluations. The presentation of a web page on one browser may be quite different than the view of the page seen by the designer of the page using another browser. The general practice is to evaluate a Web design on at least two of the more popular browsers, one at a time. It is also advisable to validate documents as well as check them in a linemode browser such as Lynx.

It is desirable to have a method and system which when given a web page, can simultaneously display multiple browser outputs on one screen to give the web designer an opportunity to visually compare the web site. In addition, this same method and system should be able to compile all of this information together in a report and rank the site for usability across the various browsers displaying the web site.

SUMMARY OF THE INVENTION

It is an objective of the present invention to provide a method and system to evaluate a web page for a variety of browser programs.

It is a second objective of the present invention to provide a method and system that enables multiple displays of a web page from different browsers simultaneously on one virtual screen.

It is a third objective of the present invention to provide method to select the browser programs for which to simultaneously view displays of a web page.

It is a fourth objective of the present invention to simultaneously evaluate the effectiveness of a web page on a multiplicity of browser programs.

It is a fifth objective of the present invention to provide a method and system to compare the simultaneous displays of a web page from selected browser programs.

The present invention is a method to develop and test applications, such as WML/HTML applications, and in particular web sites, on a multitude of user agents/browsers at the same time. This method receives and processes a WML/HTML File or URL pointing to the WML/HTML File. The present invention can use software that emulates various Web browser programs in order to test a Web design on different browsers. An emulator program can include a database of tags, which is supported by each browser in the browser set. A tag, for example, is an HTML source code tag. There are tags for images, tags for text and tags for other aspects of a Web page. Not all browsers support all of the tags. In this process, the emulator would eliminate tags not applicable to the particular browser being emulated. For example, a browser that only supports text would not be able to support images, if that browser did not have an image tag.

The emulator program would retrieve the source code for a web site, eliminate the tags not supported by the browser and show the output. For other browsers, the emulator would eliminate different tags and display the output. With this method, a page is run on each browser simultaneously and the results are simultaneously returned to the user's machine and screen as an image. This result would be in an active format that the user could see and edit as needed.

In the present invention, the user selects the browsers in which the user has an interest. The program then simultaneously executes a web page on all of the selected browsers and simultaneously displays the web page from each browser on a virtual screen. The displays are screen shots of the file as viewed on different browsers. The user can use this information to modify their HTML/WML source code and run the code again through the program and view the changes in the output. The invention, in one preferred embodiment, can incorporate a WML/HTML editor, which will allow the user to make changes on-line and recheck their results. This method receives a HTML/WML file, selects a browser on which to display the file, edit the displayed output to the file and displays the edited version of the file on the screen. This process can be repeated for a number of browsers. In an alternate embodiment, the invention can have the actual browser programs loaded in the system to execute the web page instead of implementing browser emulators.

The present invention also has the capability to rank the Web pages for its effectiveness on multiple browsers. The criteria which will be used for ranking these browsers could include:

Percentage of tags in document which are supported on each browser

Time taken to load the page

Accessibility

Time take to execute scripts in the file across different browsers

Testing of output of dynamic scripts for compatibility across the browsers

Actual "user testing" to introduce feedback data from a biased source.

There can be a system where various criteria are given different weight in the ranking system. Another approach would be to have an objective standard and measure each criteria against the standard. The results would be included on a scorecard that a web designer would use during the web site evaluation process.

DESCRIPTION OF THE DRAWINGS

FIG. 9 is an example of a browser scorecard showing the specific browser and the total browser score indicating the browser effectiveness of an executed Web page.

FIG. 10 is an example of a browser scorecard showing the specific browser, the browser score for each a several priority categories and the total browser score indicating the browser effectiveness of an executed Web page.

FIG. 11 is an example of a browser scorecard showing the specific browser, the browser score for each a several Web page characteristics and the total browser score indicating the browser effectiveness of an executed Web page.

DETAILED DESCRIPTION OF THE INVENTION

Figure 1:
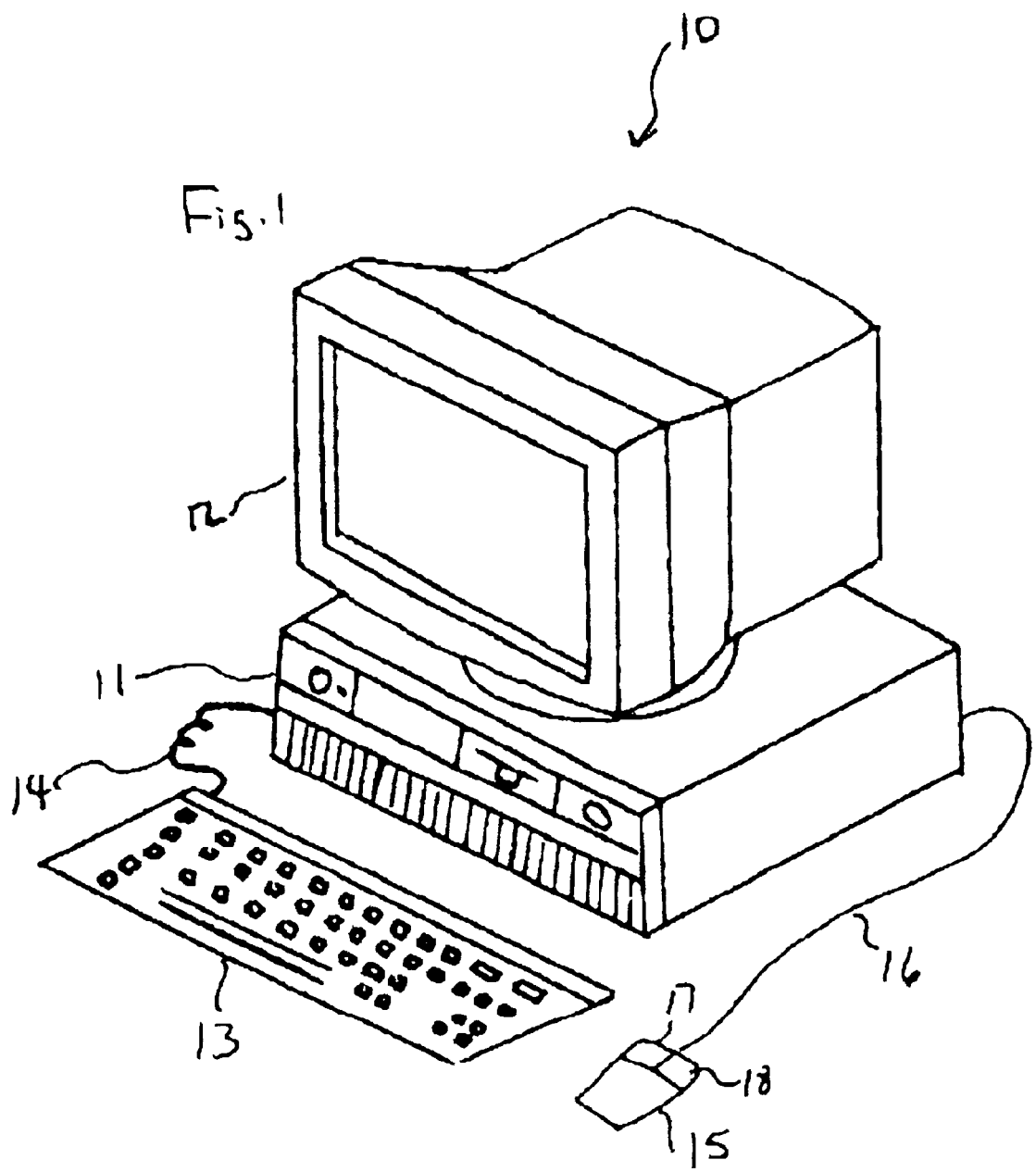
FIG. 1 depicts data processing equipment a system that can be utilized to implement the present invention.

With reference now to FIG. 1, there is depicted a pictorial representation of data processing system 10 which may be used in implementation of the present invention. As may be seen, data processing system 10 includes processor 11 that preferably includes a graphics processor, memory device and central processor (not shown). Coupled to processor 11 is video display 12 which may be implemented utilizing either a color or monochromatic monitor, in a manner well known in the art. Also coupled to processor 11 is keyboard 13. Keyboard 13 preferably comprises a standard computer keyboard, which is coupled to the processor by means of cable 14. Also coupled to processor 11 is a graphical pointing device, such as mouse 15. Mouse 15 is coupled to processor 11, in a manner well known in the art, via cable 16. As is shown, mouse 15 may include left button 17, and right button 18, each of which may be depressed, or "clicked", to provide command and control signals to data processing system 10. While the disclosed embodiment of the present invention utilizes a mouse, those skilled in the art will appreciate that any graphical pointing device such as a light pen or touch sensitive screen may be utilized to implement the method and apparatus of the present invention. Upon reference to the foregoing, those skilled in the art will appreciate that data processing system 10 may be implemented utilizing a personal computer.

The method of the present invention may be implemented in a global computer network environment such as the Internet. With reference now FIG. 2, there is depicted a pictorial representation of a distributed computer network environment 20 in which one may implement the method and system of the present invention. As may be seen, distributed data processing system 20 may include a plurality of networks, such as Local Area Networks (LAN) 21 and 22, each of which preferably includes a plurality of individual computers 23 and 24, respectively. Of course, those skilled in the art will appreciate that a plurality of Intelligent Work Stations (IWS) coupled to a host processor may be utilized for each such network. Any of the processing systems may also be connected to the Internet as shown. As is common in such data processing systems, each individual computer may be coupled to a storage device 25 and/or a printer/output device 26. One or more such storage devices 25 may be utilized, in accordance with the method of the present invention, to store the various data objects or documents which may be periodically accessed and processed by a user within distributed data processing system 20, in accordance with the method and system of the present invention. In a manner well known in the prior art, each such data processing procedure or document may be stored within a storage device 25 which is associated with a Resource Manager or Library Service, which is responsible for maintaining and updating all resource objects associated therewith.

Figure 2:
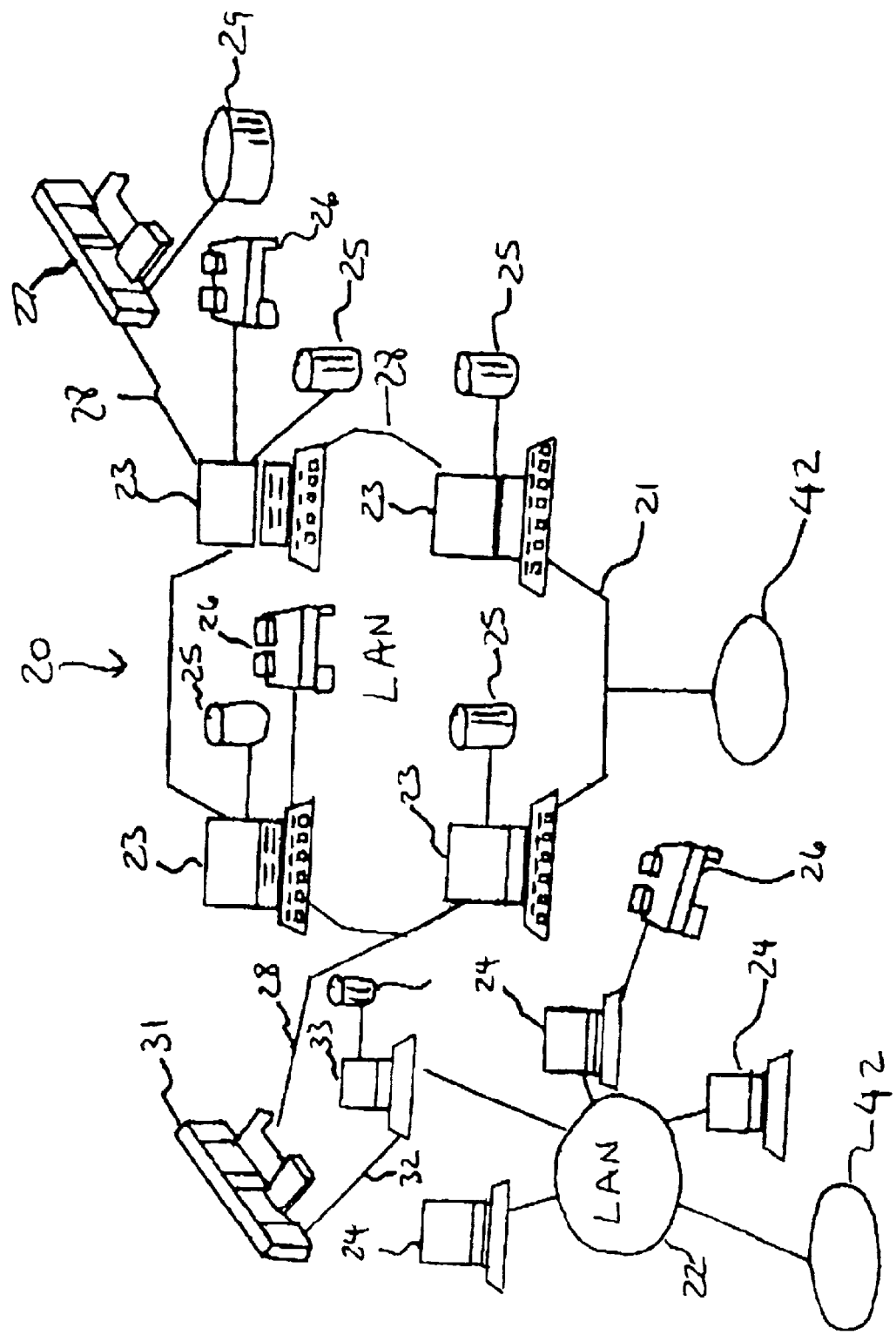
FIG. 2 is a diagram of a computer network over which user can access Web servers and software user agent emulators from a remote network location.

Still referring to FIG. 2, it may be seen that distributed data processing system 20 may also include multiple mainframe computers, such as mainframe computer 27, which may be preferably coupled to Local Area Network (LAN) 21 by means of communications link 28. Mainframe computer 27 may also be coupled to a storage device 29 which may serve as remote storage for Local Area Network (LAN) 21. A second Local Area Network (LAN) 22 may be coupled to Local Area Network (LAN) 21 via communications controller 31 and communications link 32 to a gateway server 33. Gateway server 33 is preferably an individual computer or Intelligent Work Station (IWS) that serves to link Local Area Network (LAN) 22 to Local Area Network (LAN) 21. As discussed above with respect to Local Area Network (LAN) 22 and Local Area Network (LAN) 21, a plurality of data processing procedures or documents may be stored within storage device 29 and controlled by mainframe computer 27, as Resource Manager or Library Service for the data processing procedures and documents thus stored. Of course, those skilled in the art will appreciate that mainframe computer 27 may be located a great geographical distance from Local Area Network (LAN) 21 and similarly Local Area Network (LAN) 21 may be located a substantial distance from Local Area Network (LAN) 24. That is, Local Area Network (LAN) 24 may be located in California while Local Area Network (LAN) 21 may be located within Texas and mainframe computer 27 may be located in New York.

Figure 3:
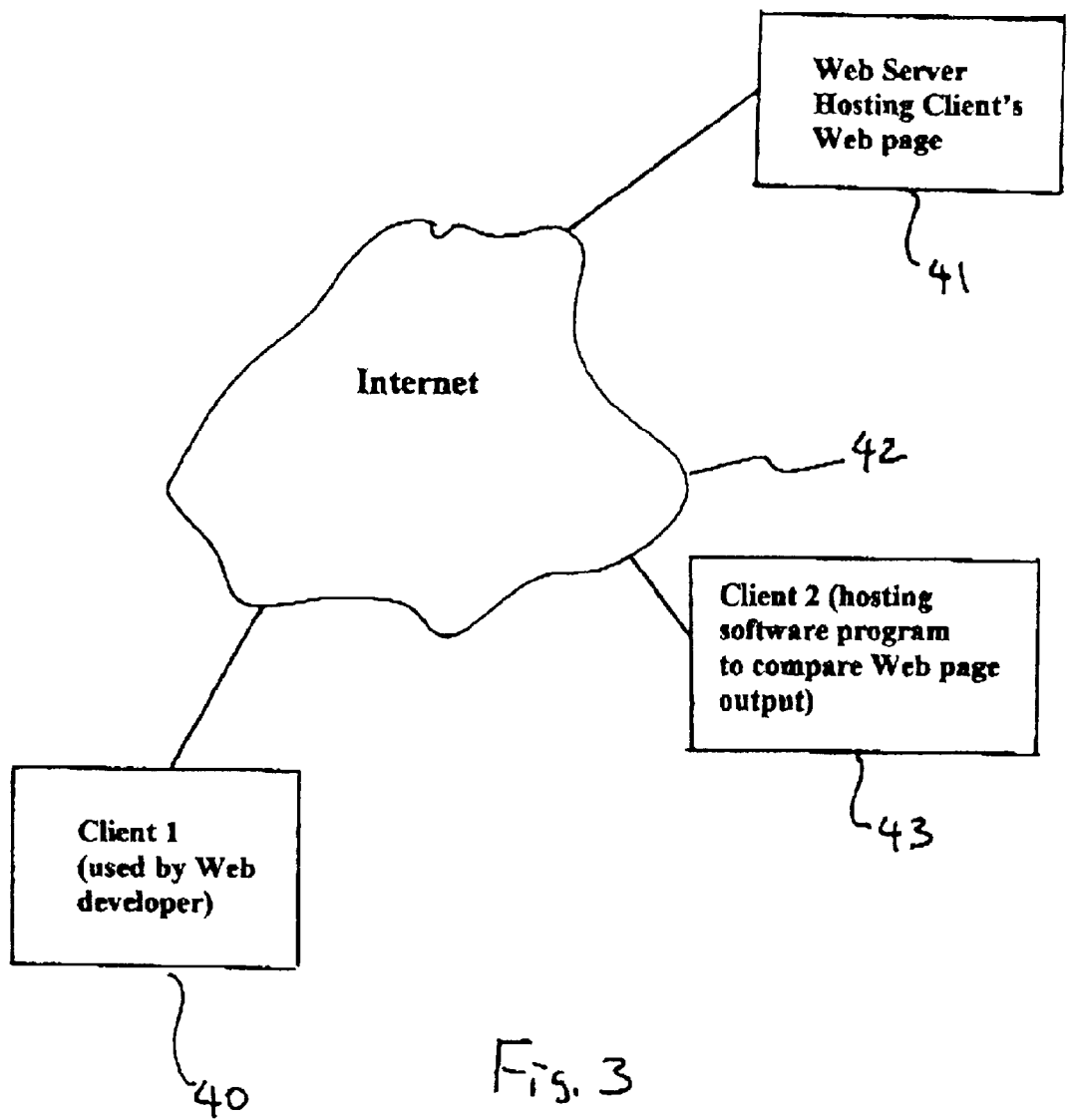
FIG. 3 is a configuration of the components of the present invention.

FIG. 3 shows a configuration of the system of the present invention. The user 40 is at one machine is a location of a Web site developer. The Web site could be hosted by a second machine 41 in a second location. This location is usually a server computer connected to the Client 1 machine via a global computer network such as the Internet 42. This server machine 41 could also be the same machine as the Client 1 machine. The Web server testing software 43, of the present invention, that is used to compare the Web page outputs can also be located on the Client machine or on the server machine or other remote site. The software could also be housed as a stand-alone tool or it could be offered as a service. If the software is used as a stand-alone tool, it could reside in the Client machine 40. If stand-alone, the software could be housed in the Client computer 40. If used in a service, the machine 43 housing the software would receive the URL for the Web page, retrieve the Web page and perform the simulation and return the results to the Client machine. The results of the simulation could be displayed as X-number of windows on the client machine or it could be in a web page that would be run on the main browser of the client machine.

Figure 4:
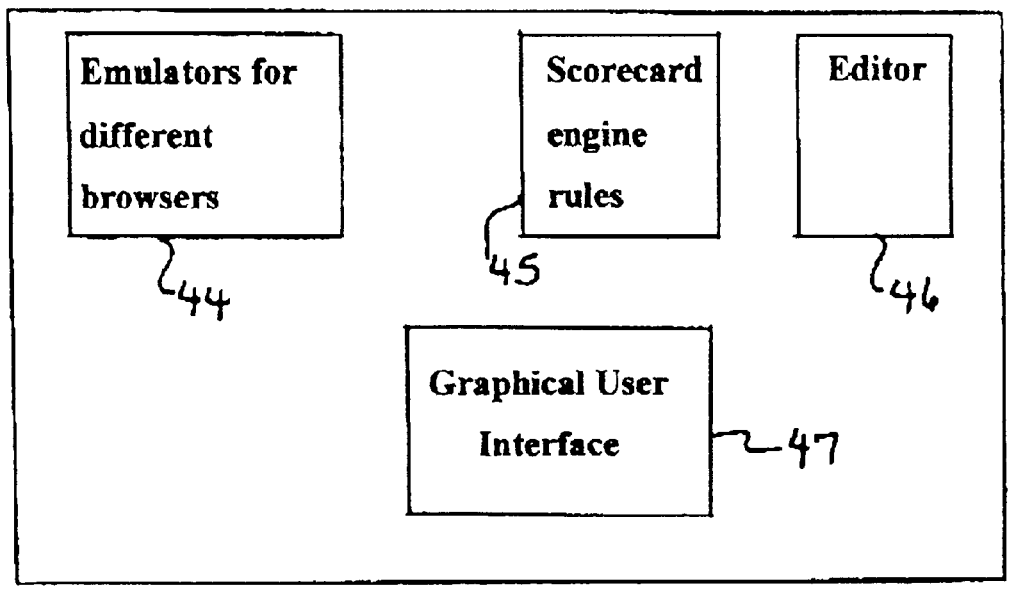
FIG. 4 is a configuration of the software implementation of the method of the present invention showing the different software components of the software program.

FIG. 4 shows the components of a software program that implements the method of the present invention. The software program could contain emulators 44 for the different browsers that a Web designer would ordinarily use during the Web testing process. However, with the present invention, a designer only needs to pass a web through the process one time. The process will enact the appropriate emulators to evaluate the page. This process eliminates the need for the current and laborious method which requires a user to input pages into the browsers one-by-one. An additional benefit of the emulators is that the emulators can emulator hardware devices that may not be present on a user's system. This ability to emulate hardware devices can reduce costs of hardware.

Another component of the software would be a scorecard rules engine 45. Also in the program would be an editor 45 that will enable a user to edit the HTML source code that describes the Web page, have the source code processed and display the edited Web page output and make changes as desired. In this process, the user can upload the source code for the Web site design from the Web server, make changes and after the edit session, and save the new version of the source code back to the original web server. Also, there would be a graphical user interface portion 47 that will process the information, aggregate the emulations and the scorecard information and send this information back to the user.

Scorecard gives the user a summary of how the web site would be displayed on the various browsers. This scorecard compares the web site as it is displayed on each browser to a standard set of criteria that includes accessibility of the web site, the percentage of the content of the web site displayed by each browser, the load time of the web site on each browser and the compatibility of scripts of the web site across different browsers. The scorecard enables the web designer to know the effectiveness of the web site across different browsers. By knowing this information, the web designer can optimize the web site design such that the most information about the site is contained on the most web sites. If for example, 80 percent of computers use only three web browsers, a web designer may only consider the effectiveness of the web design on those three browsers instead of a larger number of browsers.

Figure 5:
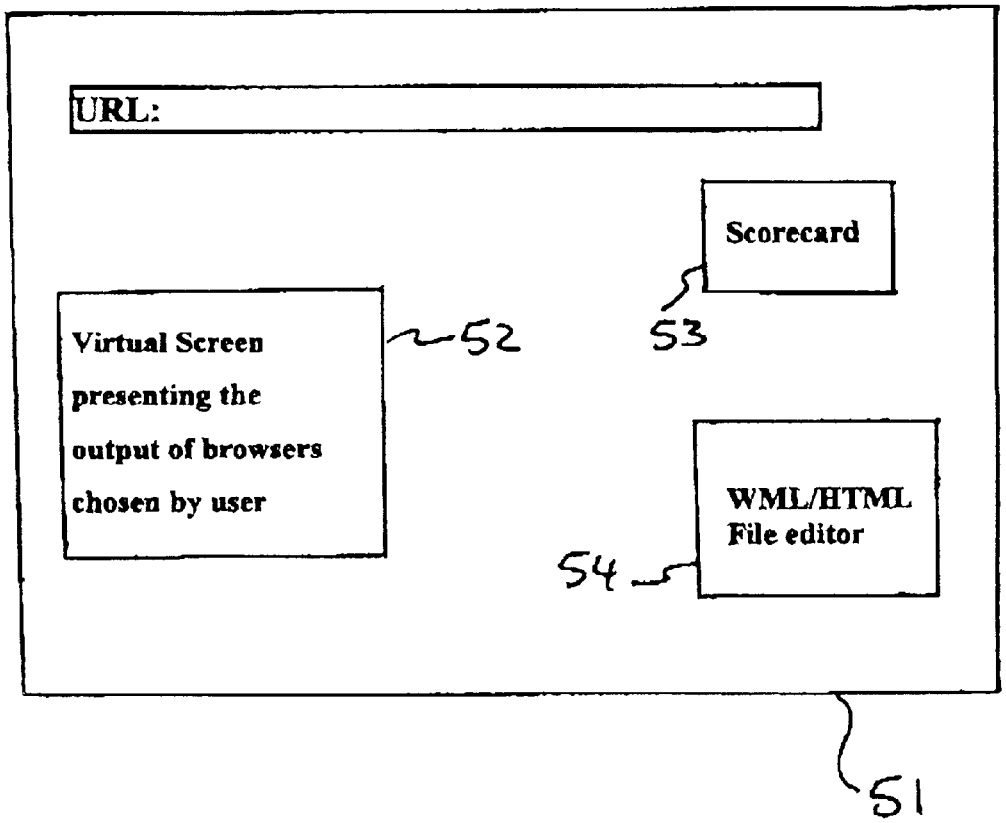
FIG. 5 is a view of a virtual screen containing a version of a Web page displayed by different user agents (browsers).

FIG. 5 gives an illustration of a display of the present invention showing a web page, as it would appear on multiple web browsers. The virtual screen 51 shows the different browsers 52 chosen by the user. The screen would also contain the scorecard information 53. The screen would also have a window 54 on the screen where the user can edit the Web page. In this process, if the user desires to view a second page from the web site on a particular browser, the user can click the page shown by that browser on the screen to indicate the desire to view the other page. As that new page appears for the chosen browser, the same page would appear on the other chosen browsers as well. This feature will enable the web designer to view and compare the same page on the different browsers. The display as shown in FIG. 5 is illustrated on a CRT device. However, with the steady emergence of handheld devices such personal digital assistances (PDAs), the display can be adapted to function on other types of display screens.

Figure 6:
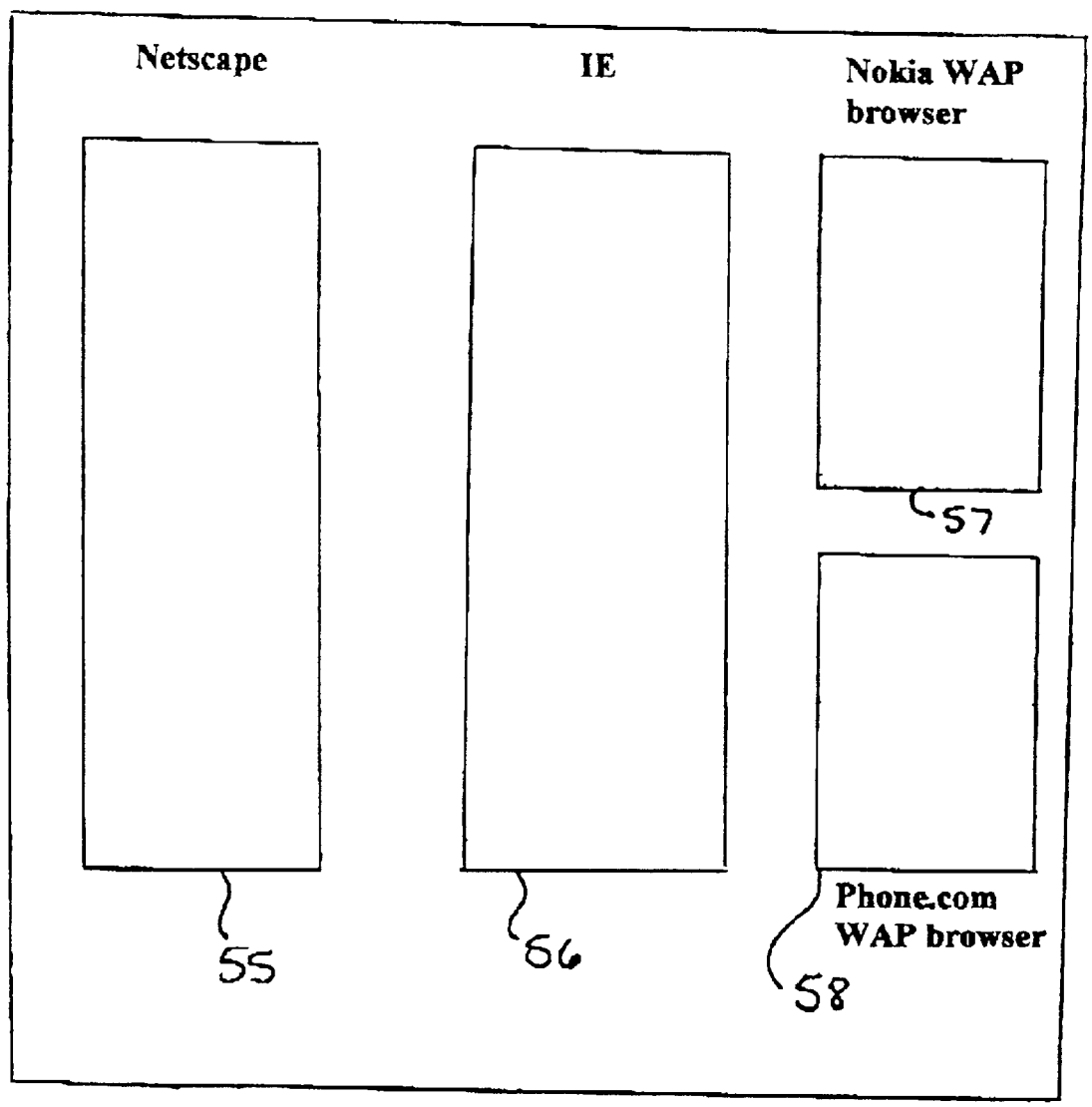
FIG. 6 is a view of a screen showing a display from multiple browsers.

FIG. 6 shows an expanded view of the browsers or emulators 52. As shown, selected browsers would execute the web site file and display a page from the web site on the screen. In this example, displays emulating four selected browsers 55, 56, 57 and 58 are on the screen. The design could use the GUI to click a link from browser display 55 to go to another page on the web site. When that page is displayed, the same page will appear for the other browsers.

Figure 7:
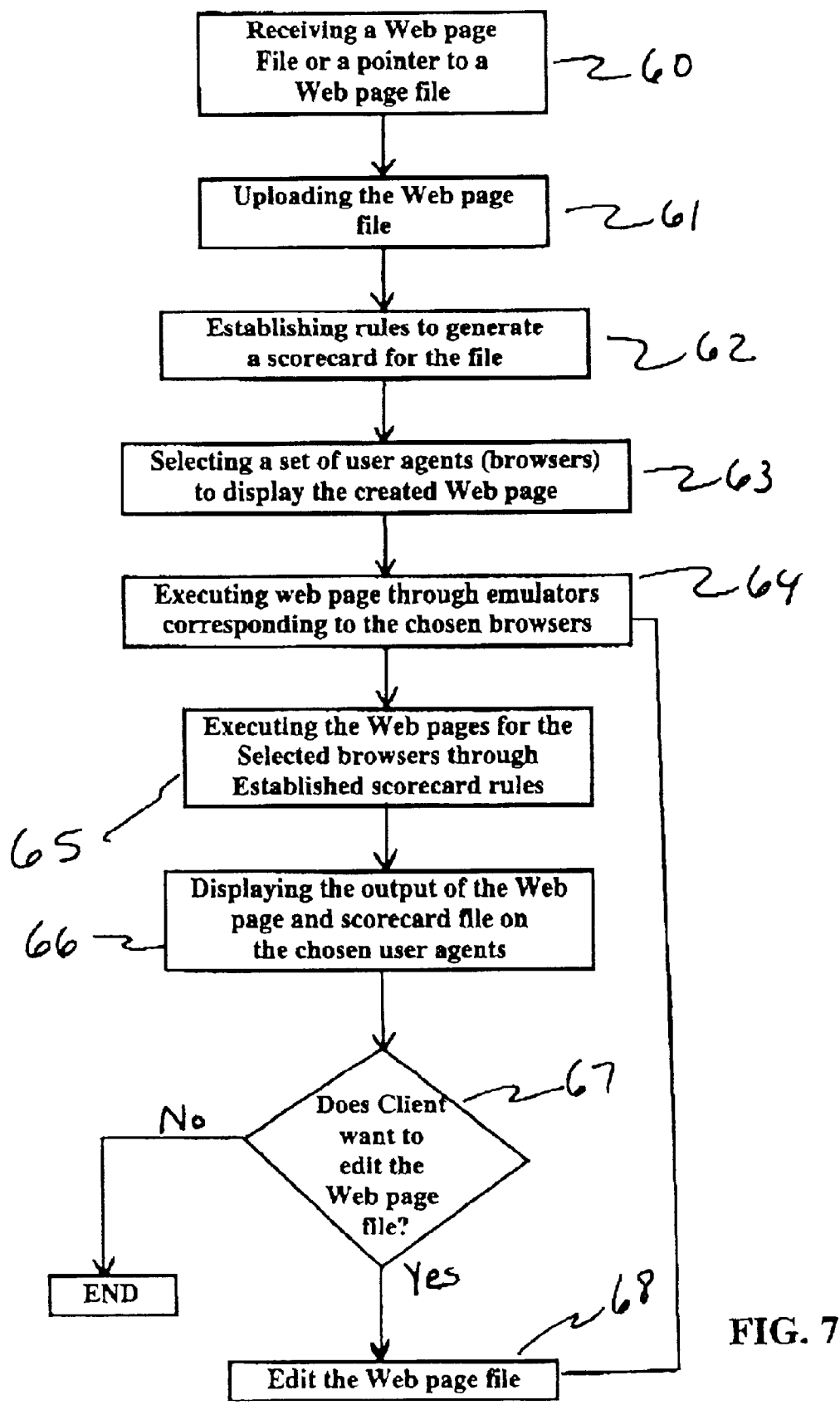
FIG. 7 is a flow diagram of the steps in the implementation of the method of the present invention.

The steps in one embodiment of the method of this invention are shown in FIG. 7. A Web designer will call the program and send it a WML/HTML file or a URL pointing to a file that contains the location of the Web site that the designer wants to evaluate. The program receives this file or URL pointer at the server location of the program in step 60. After receiving this information, in step 61 the program uploads the file. The next step 62 is to establish the rules to generate a scorecard for evaluating the web site. This scorecard will be the criteria on which the web site will be evaluated for effectiveness on the different web browsers chosen by the web designer. This will vary for the evaluation of each web design. After this scorecard is in place, the web designer selects the web browsers on which they want to view the web design, step 63. The web designer can select the desired browsers from a list of browsers located on the server containing this program. After selecting the browsers, step 64 emulates the web page for the selected browsers. This step also evaluates the web page for each selected browser using the scorecard rules generated in step 62. One method to run these pages is to use the browser emulator programs 47 illustrated in FIG. 4. Another approach would be to have the actual browser programs stored in the server machine. With either approach, step 65 displays the output of the HTML/WML file as well as the evaluation scorecard for the selected browsers 66 on the virtual screen 51.

At this point, the web designer can view the different web pages. The web designer will have an opportunity to edit the Web page if the designer is not satisfied with the Web design. The Web designer indicates whether they want to edit the Web page in step 67. If the designer chooses not to edit the Web page, the process moves to the "END" box and the method terminates. If the designer does want to edit the Web page, step 68 provides the opportunity to edit the Web page. The designer will edit the HTML/WML file of the web page as desired based on the appearance in the displays and the browser scorecard. After any changes, the edited file is again executed on each of the selected browsers in step 64. Steps 64, 65, 66 and 67 can be until the designer is satisfied with the appearance and effectiveness of the web page.

As previously mentioned, this invention also generates a report (scorecard) and rank on the effectiveness of each web site across multiple browsers. In this process, the display of a web page on each selected browser is evaluated for effectiveness using criteria such as: 1) Percentage of tags in document which are supported on each browser; 2) Time taken to load the page; 3) Accessibility; 4) Time required to execute scripts in the file across different browsers; 5) Testing of output of dynamic scripts for compatibility across the browsers; and 6) Actual "user testing" to introduce feedback data from a biased source. These listed criteria are only examples of the criteria that can be used in this evaluation. Each designer can generate their own criteria based on their individual preferences. Some web page providers serve different content for different browsers. In such cases, care should be taken to run the comparative tests against the browser specific pages.

The process for evaluating and ranking a web page across multiple browsers can form a way to standardize the design of the page across browsers. It is also useful to see how effective the page is for instance on a WAP browser. If a web page is ranked 5 on a level 1–10 on a WAP browser, the designer may be satisfied and not want to customize the web page for that browser, if it is believed that very few users will use a WAP browser to view the page.

Figure 8:
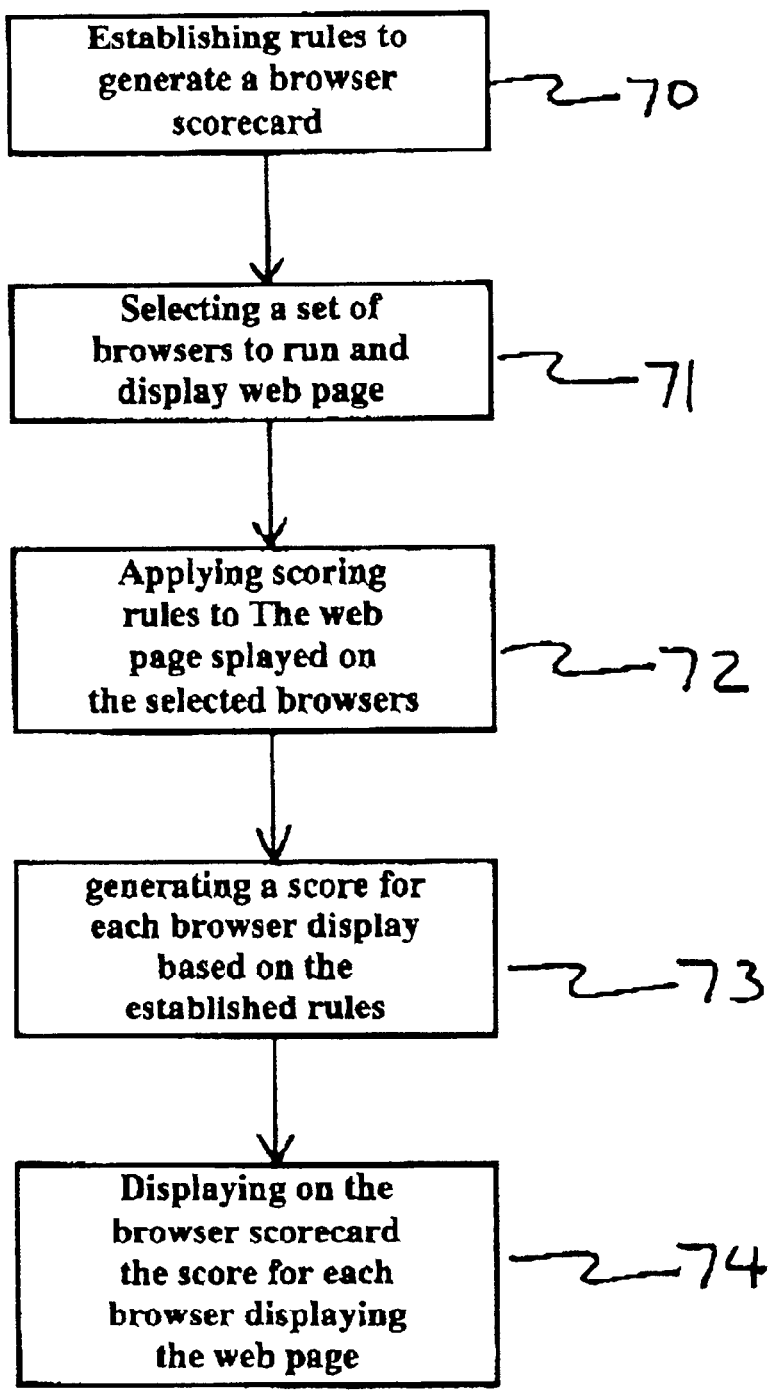
FIG. 8 is a flow diagram of the steps in the implementation of a Web page ranking method of the present invention.

The ranking calculation can be based on a constraint satisfaction algorithm. For each level or rank granted to a browser, the page has to satisfy a set of constraints. Also the cumulative quality metrics assigned to all the elements in the page are factored into the ranking. FIG. 8 shows a flow diagram of the method to evaluate the effectiveness of a web page. The method begins by establishing the rules (criteria) that will be used to evaluate each web page in step 70. As mentioned, the criteria can be a standard criteria using the previously listed elements or it can be a criteria established by the web designer. The next step 71 is to select the set of web browsers on which the web designer wants to evaluate a web page. In step 72, the code for the web page is run and the rules are applied to the web page displayed on the selected browsers. A scorecard is generated in step 73 for each browser display based on the established rules. This scorecard is displayed on the screen, in step 74, along with the browser displays for that web page. As discussed in FIG. 7, the web designer can edit the web page based on the results of the browser evaluations shown on the scorecard.

As mentioned, each browser can be ranked according to effectiveness. In this process, each browser can be assigned a net optimized effectiveness value, which is equal to an average (score on each checkpoint item). Weighted items are taken into account in this average. The browsers are ranked according to the value of the optimized effectiveness value. Also depending on the set of criteria the page passes on the target browser, this browser can be given a specific level of certification. Rankings for the browsers can be against an objective standard for browsers. The browsers can also be ranked against each other based on the total score for each browser.

FIG. 9 illustrates a sample browser scorecard that can be viewed with the display of a Web page. This scorecard gives a browser and a cumulative total score for each displayed page. As mentioned, this cumulative total score can be based on assessments of each page of a web that is viewed by the web designer. Each page of a web page can be evaluated based on a set of criteria. The score for each criterion can be used to generate to generate a final cumulative score shown on the scorecard in FIG. 9 for each listed browser. In this example, the scores could be from 1 to 10 with 10 being the maximum score. The method could then arrange the browsers on the display by score ranking the browser with the highest score first on the display.

FIG. 10 shows a scorecard with priority categories that are used to assess and score the web pages of the web site. The set of criteria used to evaluate the web page are divided into various priorities and assigned quality a weight for each priority. In operation, the evaluation procedure would pass through three priority checkpoints. Critical checkpoints are assigned the highest weight in the final ranking calculation. In an example, to pass the first priority checkpoint, 95% of the HTML tags must be supported on the browser, the web page should have alternate text for all multimedia tags, and the page should not take more than 5 seconds to download on a line with speed 56.6 k.

Priority checkpoints 2 are assigned a little lesser weight than Priority 1 checkpoints. By passing these checks in priority 2, a browser is deemed to be better than another browser only passing priority 1 critical checkpoints. In this example, all dynamic scripts must run on the browser at lease in 7 seconds. Output of the dynamic scripts should pass the accessibility criteria. Priority 3 checkpoints include features that are desirable on a page but which are not as important as the items on Priority 1 and Priority 2. A category for Priority 3 could be accessibility for various types of users such as users that have hearing or visual limitations. In FIG. 10, each browser is rated based on passing the three priority checks. As shown, only Browser 3 did not pass the Priority 1 checkpoint. In this example, Priority 1 has a weight such that passing this checkpoint would give the browser a passing score for effectiveness. In another ranking system, the checkpoint weighting may be such that Priority 1 would not have that dominant a weight. This display could reveal an actual browser score or just the notation that the browser passed the effectiveness evaluation. In addition, FIG. 10 shows how a browser performed in each priority checkpoint.

FIG. 11 shows a browser scorecard where each browser is given a score for specific criteria and a total cumulative score. This scorecard has five criteria for which to rate a browser's display of a web page. This cumulative score could be the specific scores for one web page. Each total score would represent the cumulative score of the browser for that web page of the web site. With this scorecard, the designer can observe the scores for each category and make a decision whether to edit the web site based on the effectiveness of the web site for each category.

Figure 12:
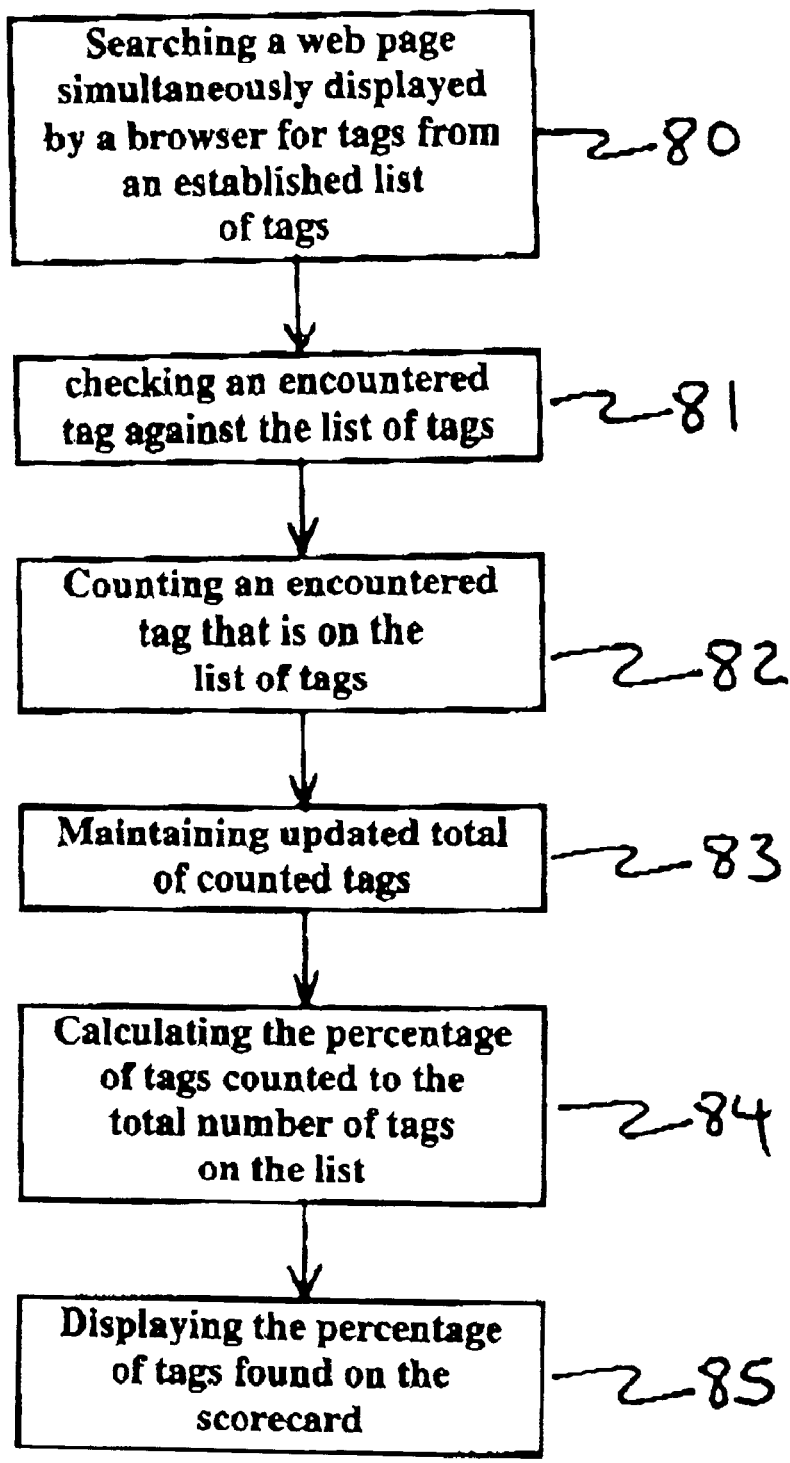
FIG. 12 is a flow diagram illustrating the operation of one criterion during the web page display ranking process.

FIG. 12 illustrates the operation of one ranking criteria during this process. As described in steps 72 and 73 of FIG. 8, established rules are applied to the web page and a scorecard is generated based on the application of these rules to the web page. In From FIG. 10, a criterion could be the number of tags from an established set of tags that exist in each browser display of the web page. In an evaluation of the displayed web page based on this criterion, the first step would be to evaluate the source code for the Web page searching for tags for the different browser displays 80. With this invention, when a tag is encountered that tag is checked against the list of established tags 81. This check step is necessary because some displays may have other tags that are not part of this evaluation. When a tag on the established list is encountered, it is counted 82 and a running total is kept for that display 83. At the completion of the search, the percentage of tags found 84 from the total number of tags is displayed 85 on the scorecard on the screen. A similar operation is performed on each browser display for each criterion on the scorecard. Each criterion would have a scoring system that would be consistent for each browser display. As shown from the scorecard of FIG. 10, the display page for Browser 1 had the highest score for effectiveness.

A critical factor in this ranking process is the establishment of the ranking criteria. There are some guidelines that exist to assist in the establishment of these guidelines. In addition, some standard guidelines currently exist that can be used to evaluate web pages on various browsers.

It is important to note that while the present invention has been described in the context of a fully functioning data processing system, those skilled in the art will appreciate that the processes of the present invention are capable of being distributed in the form of instructions in a computer readable medium and a variety of other forms, regardless of the particular type of medium used to carry out the distribution. Examples of computer readable media include media such as EPROM, ROM, tape, paper, floppy disc, hard disk drive, RAM, and CD-ROMs and transmission-type of media, such as digital and analog communications links.

Having thus described the invention, what we claims as new and desire to secure by Letters Patent is set forth in the following claims.

We claim:

1. A method for evaluating a web page from a web site simultaneously on different browser programs comprising the steps of:
   retrieving a web page from a web site file;
   simultaneously executing the web page in the different browser programs wherein the same file data is executed in each browser program;
   comparing each browser program output against an established browser criteria;
   simultaneously displaying the selected web browser outputs of the web page on a screen; and
   simultaneously displaying with the browser program outputs, the results of a comparison of each browser output against an established browser criteria.

2. The method as described in claim 1 further comprising the steps of:
   executing the displayed web page on selected browser emulators, the displayed web page having been modified in response to the displayed browser outputs and browser comparisons;
   comparing each browser program output for the modified web page against the established browser criteria; and
   simultaneously displaying selected web browser outputs of the modified web page and the results of a comparison of each browser output against an established browser criteria for the modified page.

3. The method as described in claim 1 further comprising before said web page execution step, the steps of:
   receiving a web page file;
   uploading the web page file; and
   retrieving a set of browser criteria to be used in the browser output comparison.

4. The method as described in claim 3 further comprising before said web page file receiving step, the step of receiving a URL pointing to the web page file.

5. The method as described claim 1 wherein said web browser outputs are displayed in a side-by-side fashion to enable a user to compare the displays of the browser outputs.

6. The method as described in claim 5 wherein said web browser display step comprises displaying each browser output in a separate window space on a display screen.

7. The method as described in claim 1 further comprising the step of selecting a second web page from the same web site, said selection being made through one of the browser outputs for the web page currently being displayed.

8. The method as described in claim 7 further comprising the step of displaying the selected web page on each of the different browser programs.

9. The method as described in claim 1 wherein said comparison step further comprises the step of generating a scorecard containing the results of the comparison for each different browser program.

10. The method as described in claim 9 wherein a scorecard is generated for each browser program based on the established browser comparison criteria.

11. The method as described in claim 1 wherein a web page from a web site file is uploaded on a scorecard server.

12. The method as described in claim 1 wherein the established set of browser criteria is uploaded on a scorecard server.

13. A computer program product in a computer readable medium for evaluating a web page simultaneously on different browser programs comprising of:
   instructions for retrieving a web page from a web site file;
   instructions for simultaneously executing the web page in the different browser programs wherein the same file data is executed in each browser program;
   instructions for comparing each browser program output against an established browser criteria;
   instructions for simultaneously displaying selected web browser outputs of the web page on a screen; and
   instructions for simultaneously displaying with the browser program outputs, the results of a comparison of each browser output against an established browser criteria.

14. The computer program product as described in claim 13 further comprising instructions for:
   instructions for executing the displayed web page on selected browser emulators, the web page having been modified in response to the displayed browser outputs and browser comparisons;
   instructions for comparing each browser program output for the modified web page against the established browser criteria; and
   instructions for simultaneously displaying the selected web browser outputs of the modified web page and the results of a comparison of each browser output against an established browser criteria for the modified page.

15. The computer product program as described in claim 13 further comprising before said web page execution instruction;
   instructions for receiving a web page file;
   instructions for uploading the web page file; and
   instructions for retrieving a set of browser criteria to be used in the browser output comparison.

16. The computer product program as described in claim 15 further comprising before said web page file receiving instruction, the instructions for receiving a URL pointing to the web page file.

17. The computer product program as described claim 13 further comprising instructions for displaying said web browser outputs in a side-by-side fashion to enable a user to compare the displays of the browser outputs.

18. The computer product program as described in claim 17 wherein said web browser display instructions comprise instructions for displaying each browser output in a separate window space on a display screen.

19. The computer product program as described in claim 15 further comprising instructions for selecting a second web page from the same web page file, said selection being made through one of the browser outputs for the web page currently being displayed.

20. The computer product program as described in claim 19 further comprising the instructions for displaying the selected web page on each of the different browser programs.

21. The computer product program as described in claim 13 wherein said comparison instruction further comprises instructions for generating a scorecard containing the results of the comparison for each different browser program.

22. A system for evaluating a web page simultaneously on different browser programs comprising:

browser programs capable of running a web site file and displaying an output web page for each browser program;

a user interface machine capable of simultaneously displaying the web page on multiple web browser programs;

a browser evaluation program in communication with a user interface, said browser evaluation program capable of retrieving a web file containing multiple web pages, establishing browser comparison criteria, and modifying a web page; and a communication network capable of providing a communication connection between said browser evaluation program and said user interface machine.

23. The system as described in claim 22 wherein said browser programs are installed on said user interface machine.

24. The system as described in claim 22 further comprising when said browser programs are browser emulator programs.

25. The system as described in claim 22 further comprising a server, said server containing said browsers, browser evaluation program and browser comparison criteria.

26. A method for evaluating the effectiveness of a web page from a web site simultaneously on different browser programs comprising the steps of:

simultaneously executing a web page file on the different browser programs and applying an established set of rules to the web page displayed by the different browser programs as a result of executing the web page file on the different browsers;

generating a scorecard for the different browser programs displaying the web page based on the results of the applied rules to the web page; and simultaneously displaying the selected web browser outputs of the web page and the scorecard for the browser programs displaying the web page on the same screen.

27. The method as described in claim 26 wherein said rule applying step comprises comparing each browser program output against the set of rules to assess the effectiveness of the web page on each browser program.

28. The method as described in claim 26 further comprising the steps of:

executing the displayed web page on selected browser emulators, the displayed web page having been modified in response to the displayed browser outputs and browser comparisons;

comparing each browser program output for the modified web page against established browser criteria; and simultaneously displaying the selected web browser outputs of the modified web page and the results of a comparison of each browser output against an established browser criteria for the modified page.

29. The method as described in claim 26 further comprising before said web page execution step, the steps of:

receiving a web page file;

uploading the web page file; and retrieving a set of browser criteria to be used in browser output comparison.

30. The method as described in claim 26 wherein said web page execution step comprises emulating a selected browser executing the web page on a selected browser emulator.

31. The method as described in claim 30 wherein said web browser display step comprises displaying each browser output in a separate window space on a display screen.

32. The method as described in claim 26 further comprising the step of selecting a second web page from the same web site, said selection being made through one of the browser outputs for the web page currently being displayed.

33. The method as described in claim 32 further comprising the step of displaying the selected web page on each of the different browser programs.

34. The method as described in claim 26 wherein a scorecard is generated for each browser program based on established browser comparison rules.

35. The method as described in claim 26 wherein a web page from a web site file is uploaded on a scorecard server.

36. The method as described in claim 26 wherein the established set of rules is uploaded on a scorecard server.

37. A computer program product in a computer readable medium for evaluating the effectiveness of a web page from a web site simultaneously on different browser programs comprising the steps of:

instructions for simultaneously executing a web page file on the different browser programs and applying a established set of rules to the web page displayed by the different browser programs as a result of executing the web page file on the different browsers;

instructions for generating a scorecard for the different browser programs displaying the web page based on the results of the applied rules to the web page; and instructions for simultaneously displaying selected web browser outputs of the web page and the scorecard for the browser programs displaying the web page on the same screen.

38. The computer program product as described in claim 37 wherein said rule applying instruction comprises instructions for comparing each browser program output against the set of rules to assess the effectiveness of the web page on each browser program.

39. The computer program product as described in claim 37 further comprises:

instructions for executing the displayed web page on selected browser emulators, the displayed web page having been modified in response to the displayed browser outputs and browser comparisons;

instructions for comparing each browser program output for the modified web page against established browser criteria; and instructions for simultaneously displaying the selected web browser outputs of the modified web page and the results of a comparison of each browser output against an established browser criteria for the modified page.

40. The computer program product as described in claim 37 further comprising before said web page execution instruction, instructions for:

receiving a web page file;

uploading the web page file; and retrieving a set of browser criteria to be used in browser output comparison.

41. The computer program product as described in claim 37 wherein said web page execution instruction comprises instructions for emulating a selected browser executing the web page on selected browser emulator.

42. The computer program product as described in claim 41 wherein said web browser display instruction comprises instructions for displaying each browser output in a separate window space on a display screen.

43. The computer program product as described in claim 37 further comprising the instruction of selecting a second web page from the same web site, said selection being made through one of the browser outputs for the web page currently being displayed.

\* \* \* \* \*